(12) United States Patent
Jiang (10) Patent No.: US 7,476,415 B2
(45) Date of Patent: Jan. 13, 2009

(54) PROCESS FOR APPLYING A COATING ONTO A SURFACE OF A LENS SUBSTRATE

(75) Inventor: Peiqi Jiang, Tarpon Springs, FL (US)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 352 days.

(21) Appl. No.: 11/345,599

(22) Filed: Feb. 1, 2006

(65) Prior Publication Data

US 2006/0213611 A1   Sep. 28, 2006

Related U.S. Application Data

(63) Continuation-in-part of application No. 11/048,136, filed on Feb. 1, 2005, now abandoned.

(51) Int. Cl.
*B05D 5/00* (2006.01)
(52) U.S. Cl. .................. 427/162; 427/165; 427/163.1; 427/336; 427/299; 156/305; 156/308.6
(58) Field of Classification Search ................ 427/162, 427/165, 163.1, 336, 299; 156/305, 308.6
See application file for complete search history.

(56) References Cited

U.S. PATENT DOCUMENTS

| | | | | |
|---|---|---|---|---|
| 3,261,796 A | * | 7/1966 | Simms | 524/802 |
| 4,004,049 A | * | 1/1977 | Horwat et al. | 427/208.6 |
| 4,061,518 A | | 12/1977 | Burroughs et al. | 156/232 |
| 4,064,518 A | | 12/1977 | Douglas | 396/34 |
| 4,211,823 A | | 7/1980 | Suzuki et al. | 428/412 |
| 4,240,860 A | * | 12/1980 | Pole et al. | 428/492 |
| 4,242,162 A | | 12/1980 | Ronning et al. | 156/212 |
| 4,374,158 A | | 2/1983 | Taniguchi et al. | 427/536 |
| 4,425,403 A | | 1/1984 | Taniguchi et al. | 428/331 |
| 4,927,480 A | | 5/1990 | Vaughan | 156/228 |
| 5,015,523 A | | 5/1991 | Kawashima et al. | 428/336 |
| 5,316,791 A | | 5/1994 | Farber et al. | 427/164 |
| 5,512,371 A | | 4/1996 | Gupta et al. | 428/412 |
| 6,003,515 A | | 12/1999 | Maness | 128/857 |
| 6,242,065 B1 | | 6/2001 | Blomberg et al. | 428/64.1 |
| 6,335,124 B1 | | 1/2002 | Mitsui et al. | 430/5 |
| 6,503,631 B1 | | 1/2003 | Faverolle et al. | 428/447 |
| 6,562,466 B2 | | 5/2003 | Jiang et al. | 428/412 |

(Continued)

FOREIGN PATENT DOCUMENTS

EP   0404111   6/1990

(Continued)

OTHER PUBLICATIONS

Owens, et al., "Estimation of the Surface Force Energy of Polymers," *J. Appl. Polym. Sci.*, 13:1741-1747, 1969.

(Continued)

*Primary Examiner*—Alain L Bashore
(74) *Attorney, Agent, or Firm*—Fulbright & Jaworski L.L.P.

(57) ABSTRACT

A method of applying a coated or uncoated film onto a main surface of a lens substrate. In some cases, the film is a coated film having one surface bearing a coating or a coating stack which is transferred from the film to the lens substrate main surface.

31 Claims, 5 Drawing Sheets

U.S. PATENT DOCUMENTS

| | | |
|---|---|---|
| 6,624,237 B2 | 9/2003 | Biteau et al. .............. 524/588 |
| 6,740,699 B2 | 5/2004 | Tardieu et al. ............ 524/481 |
| 6,770,710 B2 | 8/2004 | Robert et al. .............. 524/832 |
| 6,911,005 B2 | 6/2005 | Ouchi et al. ............... 600/121 |
| 6,919,134 B2 | 7/2005 | Mitsuishi et al. ........... 428/447 |
| 2002/0009546 A1 | 1/2002 | Koike et al. ............ 427/255.27 |
| 2003/0017340 A1 | 1/2003 | Jiang et al. ................. 428/412 |
| 2004/0065968 A1 | 4/2004 | Klemm et al. ................ 264/2.5 |
| 2004/0263731 A1* | 12/2004 | Hata ........................ 349/118 |
| 2005/0128393 A1* | 6/2005 | Yano et al. ................ 349/118 |

FOREIGN PATENT DOCUMENTS

| | | |
|---|---|---|
| EP | 0614957 | 9/1997 |
| EP | 0796719 | 9/1997 |
| EP | 1161512 | 2/2004 |
| EP | 1426168 | 2/2005 |
| JP | 63-087223 | 4/1988 |
| JP | 63-141001 | 6/1988 |
| WO | WO 93/21010 | 10/1993 |
| WO | W0 94/10230 | 5/1994 |
| WO | WO 95/13904 | 5/1995 |
| WO | WO 97/35216 | 9/1997 |
| WO | WO 99/24243 | 5/1999 |
| WO | WO 03/004255 | 1/2003 |

OTHER PUBLICATIONS

Sobieski et al., Handbook of Pressure-Sensitive Adhesive Technology, $2^{nd}$ ed., D. Satas, ed., pp. 508-517.

* cited by examiner

PROCESS FOR APPLYING A COATING ONTO A SURFACE OF A LENS SUBSTRATE

CROSS-REFERENCE TO RELATED APPLICATIONS

This application is a continuation-in-part of co-pending U.S. patent application Ser. No. 11/048,136 filed Feb. 1, 2005. The entire text of the above-referenced disclosure is specifically incorporated by reference herein without disclaimer.

BACKGROUND OF THE INVENTION

1. Field of the Invention

The present invention relates to an improved process or method for applying a coated or uncoated film onto at least one main surface of a lens substrate which can be implemented in a short period of time without any risk of deformation of the lens substrate which avoids the use of a light or thermal curing adhesive during the application of the film onto the main surface of the lens substrate.

2. Description of Related Art

It is a common practice in the art to coat at least one main surface of a lens substrate, such as an ophthalmic lens or lens blank, with several coatings for imparting to the finished lens additional or improved optical or mechanical properties.

Thus, it is usual practice to coat at least one main surface of a lens substrate, typically made of an organic glass material, with successively, starting from the surface of the lens substrate, an impact-resistant coating (impact resistant primer), an abrasion and/or scratch-resistant coating (hard coat), an anti-reflecting coating and, optionally, a hydrophobic top coat. Other coatings such as a polarized coating, a photochromic or a dying coating may also be applied onto one or both surfaces of the lens substrate.

Numerous processes and methods have been proposed for coating a surface of an ophthalmic lens and are disclosed.

U.S. Pat. No. 6,562,466 describes one process or method for transferring a coating from at least one mold part onto at least a geometrically defined surface of a lens blank comprising:

providing a lens blank having at least one geometrically defined surface;
providing a support or mold part having an internal surface bearing a coating and an external surface;
depositing on said geometrically defined surface of said lens blank or on said coating a pre-measured amount of a curable adhesive composition;
moving relatively to each other the lens blank and the support to either bring the coating into contact with curable adhesive composition or bring the curable adhesive composition into contact with the geometrically defined surface of the lens blank;
applying a sufficient pressure onto the external surface of the support so that the thickness of a final adhesive layer once the curable composition cured is less than 100 micrometers;
curing the layer of adhesive composition; and
withdrawing the support or mold part to recover the lens blank with the coating adhered onto the geometrically defined surface of said lens blank.

In the process of U.S. Pat. No. 6,562,466, a light or thermal curing adhesive is used to transfer the coating layers from the support to the surface of the lens substrate. The adhesive is required to stick both to the exposed film on the support and the surface of the lens substrate.

Using a chemical adhesive has several drawbacks regarding toxicity, handling, environment and cost.

SUMMARY OF THE INVENTION

Therefore, one object of the invention is to provide a process or method for applying a coated or uncoated film onto a main surface of a lens substrate which does not include the use of an adhesive during the application process.

A further object of the invention is to provide a process as above, in which the film is a coated film having one surface bearing a coating or a coating stack which is transferred from the film to the lens substrate main surface at the end of the application step, after withdrawal of the film;

A still further object of the invention is to provide a process for applying a coated or uncoated film onto a surface of a lens substrate without the use of an adhesive, in which the coated or uncoated film is adhered to the main surface of the lens substrate, at the end of the application process.

The above objects are achieved according to the invention by providing a process for applying a coated or uncoated film onto at least one main surface of a lens substrate which comprises the steps of:

(a) providing a lens substrate having main surfaces;
(b) providing a coated or uncoated film;
(c) forming, on either a face of the coated or uncoated film or one of the said main surfaces of the lens substrate, a layer of a dry latex;
(d) depositing at least one drop of a water base activating liquid on either one of the said main surfaces of the lens substrate, a face of the coated or uncoated film or an exposed surface of the dry latex layer;
(e) moving relatively to each other the coated or uncoated film and the lens substrate and applying a sufficient force to the coated or uncoated film to spread the water base activating liquid and form a thin pellicule of the water base activating liquid between the dry latex layer and either the lens substrate or the coated or uncoated film;
(f) heating the thin pellicule of water base activating liquid and the dry latex layer;
(g) releasing the applied force; and
(h) recovering the lens substrate with the coated or uncoated film adhered to the lens substrate main surface.

Preferably, heating step (f) is performed at a temperature higher than the "tacky" temperature of the dry latex layer. The "tacky" temperature is the temperature at which the dry latex layer becomes sticky.

Typically, heating step (f) is performed at a temperature ranging from 40° C. to 130° C., preferably 50° C. to 120° C.

In one embodiment of the process of the invention the film is a coated film preferably comprising a carrier, preferably a flexible carrier, having one surface bearing a coating or a stack of coatings and the process further comprises a step (i) of withdrawing the carrier whereby the coating or stack of coatings is transferred from the carrier on the main surface of the lens substrate. In that embodiment, the dry latex layer is formed either on the coating or stack of coatings or on the main surface of the lens substrate, preferably on the coating stack of the carrier. Of course, when the carrier is coated with a stack of coatings, the coatings are applied on the surface of the carrier in the reverse order with regard to the desired order of the coating stack on the lens substrate.

In another embodiment, the film is an uncoated film, such as a polarizing film, a coloured film, a photochromic film or a combination of such films. In that embodiment the dry latex layer is formed either on one surface of the film or on a main surface of the lens substrate, or on both sides of the uncoated film surface and the main surface of the lens substrate.

In a still further embodiment, the film is a coated film comprising a carrier, preferably a flexible carrier, having one surface coated with a coating or a stack of coatings, the carrier being intended to remain on the lens substrate after completion of the application process. The flexible carrier may be a polarizing film, a coloured film, a photochromic film or a combination thereof. In that latter embodiment, the dry latex layer may be applied on the coating or stack of coatings, the uncoated surface of the flexible carrier or on a main surface of the lens substrate.

Preferably, the coated or uncoated film is applied on the rear surface (generally the concave surface) of the lens substrate, i.e. the surface of the lens substrate which, in use, is the closest to the wearer's eye, except when the film is an uncoated film, in particular a polarized film, where it is preferably applied on the front surface (generally the convex surface) of the lens substrate, i.e. the surface of the lens substrate which, in use, is the farthest form the wearer's eye.

Of course, rear and front surfaces of the lens substrate can be both coated using the process of the invention.

The rear or front surface to be coated in this invention could be a sphere, toric or progressive curve by using adequate sphere flexible carrier.

The present invention also encompasses the case where the latex layer is pre-deposited on a coated or uncoated film which may be stored and later used in the process of the invention.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawings wherein.

DETAILED DESCRIPTION OF THE INVENTION AND PREFERRED EMBODIMENTS

In this patent application, when one refers to the base curvature of the carrier, one means the base curvature of the working surface of the carrier, that is to say the surface which is going to adhere to the lens substrate or which bears the coatings to be transferred to the lens substrate, after withdrawal of the carrier.

In the same way, base curvature of the lens substrate means the base curvature of the surface to which the carrier is going to adhere or which bears the coatings that are going to be transferred.

In this application, the base curvature has the following definition:

For a spheric surface, having a radius of curvature R, base curvature (or base)=530/R (R in mm).

Such a definition is quite classical in the art.

For a toric surface, there are two radii of curvature, and one calculates, according to the above formula, two base curvatures BR, Br with BR<Br.

The lens substrate is generally a lens or lens blank, preferably an ophthalmic lens or lens blank.

The substrate is preferably a lens blank.

The lens substrate may be polished or only fined without being polished.

Preferably, the main surface of the lens substrate onto which the coated or uncoated film is applied, is a geometrically defined surface.

The main surface of the lens substrate (preferably the rear (concave) surface) on which the film is to be applied or coatings to be transferred may be a spheric, toric or progressive surface.

By geometrically defined surface of the lens substrate, there is meant either an optical surface, that is a surface of required geometry and smoothness or a surface having a required geometry but that may still exhibit some roughness, such as a lens blank that has been grinded and fined, but not polished to the required geometry. The surface roughness typically ranges from Sq $10^{-3}$ μm to 1 μm, preferably from $10^{-3}$ to 0.5 μm and most preferably from $10^{-3}$ to 0.1 μm.

Sq: Quadratic mean of the deviations from the mean $$Sq = \sqrt{\frac{1}{NM} \sum_{x=1}^{N} \sum_{y=1}^{M} Zx, y^2}$$

Computes the efficient value for the amplitudes of the surfaces (RMS). This parameter is included in the EUR 15178 EN report (Commission of the European Communities) Stout et al.

1993: The development of methods for the characterization of roughness in three dimensions.

The roughness ($S_q$) was measured by P-10 long scan of KLA-tencor.

The measurement condition was under 2 μm tip 1 mg force 10 scans 500 μm long 2000 data points.

The state of the surface of a lens being fined without being polished can also be expressed in terms of Rq.

Preferably, such a lens substrate has a Rq which ranges from 0.01 micron to 1.5 microns, preferably from 0.05 to 1.5 microns; more preferably from 0.1 to 1 micron.

Rq is determined as follows:

A TAYLOR HOBSON FTS (Form Talysurf Series 2) profilometer/roughness measuring systems is advantageously used to determined the root-mean-square profile height Rq (2DRq) of the surface (also referred as roughness Rq before).

The system includes a laser head (product reference 112/2033-541, for example) and a 70 mm long feeler (product reference 112/1836) having a 2 mm radius spherical/conical head.

The system measures a two-dimensional profile in the chosen section plane to obtain a curve Z=f(x). In this example the profile is acquired over a distance of 20 mm.

Various surface characteristics can be extracted from this profile, in particular its shape, undulation and roughness.

Accordingly, to determine Rq, the profile is subject to two different processes, namely shape extraction and filtering, which corresponds to mean line extraction.

The various steps for determining a parameter Rq of this kind are as follows:

acquisition of the profile Z=f(x),
shape extraction,
filtering (mean line extraction), and
determination of parameter $R_q$.

The profile acquisition step consists in moving the stylus of the aforementioned system over the surface of the lens in question, to store the altitudes Z of the surface as a function of the displacement x.

In the shape extraction step, the profile obtained in the previous step is related to an ideal sphere, i.e. a sphere with minimum profile differences relative to that sphere. The mode chosen here is the LS arc mode (best circular arc extraction).

This provides a curve representative of the characteristics of the profile of the surface in terms of undulation and roughness.

The filtering step retains only defects corresponding to certain wavelengths. In this example, the aim is to exclude undulations, a form of defect with wavelengths higher than the wavelengths of defects due to roughness. Here the filter is of the Gaussian type and the cut-off used is 0.25 mm.

Rq is determined from the curve obtained using the following equation:

$$Rq = \sqrt{\frac{1}{N}\sum_{n=1}^{N}(Zn)^2}$$

Where Zn is, for each point, the algebraic difference Z relative to the mean line calculated during filtering.

Although the lens substrate can be made of mineral glasses or organic glasses, it is preferably made of organic glasses.

The organic glasses can be either thermoplastic materials such as polycarbonates and thermoplastic polyurethanes or thermosetting (cross linked) materials such as diethyleneglycol bis allylcarbonate polymers and copolymers (in particular CR 39® PPG), thermosetting polyurethanes, polythiourethanes, polyepoxides, polyepisulfides, poly(meth)acrylates, polythio(meth)acrylates, as well as copolymers and blends thereof.

Preferred materials for the lens substrate are polycarbonates and diethylene glycol bis allyl carbonate copolymers, in particular substrates made of polycarbonate.

The main surface of the lens substrate to be coated is preferably pretreated to promote adhesion of the dry latex layer.

Any physical or chemical adhesion promoting pretreatment step can be used such as a solvent treatment, a Na OH treatment or a corona discharge treatment. Preferably the lens substrate main surface to be coated is pretreated by corona discharge.

The dry latex layer may be formed by applying a liquid latex on either the coated or uncoated surface of a coated film, a surface of an uncoated film or a main surface of the lens substrate. Application can be performed by any usual process such a dip coating, flow coating or spin coating. Thereafter, the deposited liquid latex layer is dried by heating. Usually, heating will be performed at a temperature ranging from 40° C. to 130° C. and will be preferably pursued until at least a tack free layer is obtained. Typically heating will last from 60° to 100° C. for 15 seconds to 90 seconds.

Preferred latexes are (meth)acrylic latexes such as the acrylic latex commercialized under the name Acrylic latex A-639 by Zeneca, polyurethane latexes such as the latexes commercialized under the names W-213, W-240 and W-234 by Baxenden and polyester latexes. Preferred latexes are polyurethane latexes.

Other preferred latexes are core/shell latexes such as those described in Essilor U.S. Pat. No. 6,503,631 and especially latexes based on alkyl(meth)acrylates such as butylacrylate or butyl(meth)acrylate.

In a preferred embodiment, the latex layer may also include an effective amount of a coupling agent (as defined hereinafter) in order to promote adhesion of the latex layer with the substrate and/or the coated or uncoated film, in particular an abrasion and/or scratch-resistant coating of a coated film.

The latexes may also comprise a classical dye or a photochromic dye.

Latexes comprising a photochromic dye and the method for obtaining them are disclosed for example in the following Essilor patents: EP 1161512; U.S. Pat. Nos. 6,770,710; 6,740,699.

Generally, after drying and curing the latex layer has a thickness ranging from 0.05 to 30 μm, preferably from 0.5 to 20 μm and better from 0.6 to 15 μm.

The latex layer may preferably constitute an impact-resistant primer coating of the coated lens substrate.

Then the latex preferably fulfills the preferred requirements of impact resistant primer coating such as Tg of the latex layer being less than 30° C.

Cured latexes, in particular polyurethane latex, having a low glass transition temperature Tg are preferred since they result in a better transfer and a better adhesion. Thus, the dry latex layer preferably has a Tg lower than 0° C., more preferably lower than –10° C., better lower than –20° C. and even better lower than –40° C.

Also, latexes having low "tacky" temperatures are preferred. Thus, preferred latexes have "tacky" temperatures $\leq 80°$ C., generally ranging from 40° C. to 80° C. preferably from 50° C. to 75° C.

By "activating liquid" there is meant a liquid which, when contacting the dry latex layer under the processing conditions, in particular under heating, imparts to the dry latex layer adhesive properties.

The water base activating liquid may be water, preferably dionized water, or a mixture of water and one or more classical organic solvents such as alkanols, typically $C_1$-$C_6$ alkanols such as for example methanol or ethanol. Preferably there is no organic solvent.

The water base activating liquid can also be a latex, preferably a mixture of an aqueous solvent and of a latex, such as preferably a polyurethane latex. In preferred embodiments, the latex used as a water base activating liquid has a maximum dry extract of 20% by weight and better of maximum of 15% by weight.

The latexes used for the water base activating liquid are preferably the same as the latexes used for making the dry latex layer.

Typically there is deposited at least one drop of water base activating liquid at the center of the main surface of the lens substrate itself or on the dry latex layer when it is formed on the lens substrate main surface.

The amount of water base activating liquid must be sufficient to form a continuous thin pellicule over, preferably, the entire dry latex layer during the application process.

As indicated above the applied film may be a coated or uncoated film.

When the applied film is a coated film, it comprises a carrier, preferably a flexible carrier, having one surface coated with a coating or a stack of coatings, generally classical functional coatings.

The flexible carrier may be a removable carrier, i.e. a carrier that is intended to be removed at the end of the application process, so that only the coating or stack of coatings is transferred to the lens substrate main surface after completion of the process.

Preferred removable carrier may be a thin supporting element made of a plastic material especially a thermoplastic material and in particular of polycarbonate. Generally, such a removable carrier has a thickness ranging from 0.2 to 5 mm, preferably from 0.5 to 2 mm.

When a removable carrier is used, the dry latex layer is either formed on the coating or stack of coatings borne by the carrier, or on the lens substrate main surface.

The carrier, preferably a flexible carrier, of the coated film may also be a permanent carrier, i.e. which remains on the final lenses or a semi-permanent carrier, i.e. which remains on the coated lens substrate at the completion of the present process but can be eliminated later if needed. Examples of permanent carriers are polarizing films, coloured or photochromic films, optical-electronical films, electric-photochromic films, or printed films, microstructured or logo film. The thickness of the film could be from 0.3 to 1.5 mm When permanent or semi-permanent carriers are used, the dry latex layer may also be formed on the uncoated surface of the flexible carrier.

Usual functional coatings, as is well known, comprise hydrophobic top coats, anti-reflecting coatings, anti-abrasion and/or scratch-resistant coatings, impact-resistant coatings, polarized coatings, photochromic coatings, dyed coatings, printed layers.

Preferably, the coated film comprises a stack of coating layers including a hydrophobic top coat layer, an anti-reflective coating (AR coating) layer, a scratch and/or abrasion resistant coating (hardcoat) layer, and optionally an impact-resistant coating layer (which can be the latex layer itself), these layers being deposited in this indicated order (reverse from the final order on the optical article) when the carrier is a removable carrier or is intended to be the outermost layer of the coated lens substrate or final optical article.

Of course, if the carrier is intended to be an intermediate layer between the lens substrate and the stack of coatings, the coating layers are deposited on one surface of the carrier in the order they shall achieve in the final product (in fact the reverse of the above indicated order).

The hydrophobic top coat, which in the finished optical article constitutes the outermost coating on the lens substrate, is intended for improving dirty mark resistance of the finished optical article and in particular of the anti-reflecting coating.

As known in the art, a hydrophobic top coat is a layer wherein the stationary contact angle to deionized water is at least 60°, preferably at least 75° and more preferably at least 90°, and even better more than 100°.

The stationary contact angle is determined according to the liquid drop method in which a water drop having a diameter smaller than 2 mm is formed on the optical article and the contact angle is measured.

The hydrophobic top coats preferably used in this invention are those which have a surface energy of less than 14 mJoules/m$^2$.

The invention has a particular interest when using hydrophobic top coats having a surface energy of less than 13 mJoules/m$^2$ and even better less than 12 m Joules/m$^2$.

The surface energy values referred just above are calculated according to Owens Wendt method described in the following document: "Estimation of the surface force energy of polymers" Owens D. K.-Wendt R. G. (1969) J. Appl. Polym. Sci., 1741-1747.

Such hydrophobic top coats are well known in the art and are usually made of fluorosilicones or fluorosilazanes i.e. silicones or silazanes bearing fluor-containing groups. Example of a preferred hydrophobic top coat material is the product commercialized by Shin Etsu under the name KP 801M.

The top coat may be deposited onto the carrier using any typical deposition process, but preferably using thermal evaporation technique.

Thickness of the hydrophobic top coat usually ranges from 1 to 30 nm, preferably 1 to 15 nm.

Anti-reflecting coatings and their methods of making are well known in the art. The anti-reflecting can be any layer or stack of layers which improves the anti-reflective properties of the finished optical article.

The anti-reflecting coating may preferably consist of a mono- or multilayer film of dielectric materials such as SiO, $SiO_2$ $Si_3N_4$, $TiO_2$, $ZrO_2$, $Al_2O_3$, $MgF_2$ or $Ta_2O_5$, or mixtures thereof.

The anti-reflecting coating can be applied in particular by vacuum deposition according to one of the following techniques:
1)—by evaporation, optionally ion beam-assisted;
2)—by spraying using an ion beam,
3)—by cathode sputtering; or
4)—by plasma-assisted vapor-phase chemical deposition.

In case where the film includes a single layer, its optical thickness must be equal to $\lambda/4$ where $\lambda$ wavelength of 450 to 650 nm is.

Preferably, the anti-reflecting coating is a multilayer film comprising three or more dielectric material layers of alternatively high and low refractive indexes.

Of course, the dielectric layers of the multilayer anti-reflecting coating are deposited on the optical surface of the mold part or the hydrophobic top coat in the reverse order they should be present on the finished optical article.

A preferred anti-reflecting coating may comprises a stack of four layers formed by vacuum deposition, for example a first $SiO_2$ layer 21 having an optical thickness of about 100 to 160 nm, a second $ZrO_2$ layer 22 having an optical thickness of about 120 to 190 nm, a third $SiO_2$ layer 23 having an optical thickness of about 20 to 40 nm and a fourth $ZrO_2$ layer 24 having an optical thickness of about 35 to 75 nm.

Preferably, after deposition of the four-layer anti-reflecting stack, a thin layer of $SiO_2$ of 1 to 50 nm thick (physical thickness) may be deposited. This layer promotes the adhesion between the anti-reflecting stack and the abrasion and/or scratch-resistant coating generally subsequently deposited, and is not optically active.

The next layer to be deposited is the abrasion and/or scratch-resistant coating. Any known optical abrasion and/or scratch-resistant coating composition can be used to form the abrasion and/or scratch-resistant coating. Thus, the abrasion and/or scratch-resistant coating composition can be a UV and/or a thermal curable composition.

By definition, an abrasion and/or scratch-resistant coating is a coating which improves the abrasion and/or scratch-resistant of the finished optical article as compared to a same optical article but without the abrasion and/or scratch-resistant coating.

Preferred abrasion and/or scratch-resistant coatings are those made by curing a precursor composition including epoxyalkoxysilanes or a hydrolyzate thereof, optionally colloidal mineral fillers and a curing catalyst. Examples of such compositions are disclosed in U.S. Pat. No. 4,211,823, WO 94/10230, U.S. Pat. No. 5,015,523, EP 614957.

The most preferred abrasion and/or scratch-resistant coating compositions are those comprising as the main constituents an epoxyalkoxysilane such as, for example, γ-glycidoxypropyltrimethoxysilane (GLYMO) and a dialkyldialkoxysilane such as, for example dimethyldiethoxysilane (DMDES), colloidal silica and a catalytic amount of a curing catalyst such as aluminum acetylacetonate or a hydrolyzate thereof, the remaining of the composition being essentially comprised of solvents typically used for formulating these compositions.

In order to improve the adhesion of the abrasion and/or scratch-resistant coating to the impact-resistant primer coating to be subsequently deposited or to the latex layer, an effective amount of at least one coupling agent can be added to the abrasion and/or scratch-resistant coating composition.

The preferred coupling agent is a pre-condensed solution of an epoxyalkoxysilane and an unsaturated alkoxysilane, preferably comprising a terminal ethylenic double bond.

Examples of epoxyalkoxysilanes are:
γ-(glycidoxypropyl)trimethoxysilane,
γ-(glycidoxypropyl)pentamethyldisiloxane,
γ-(glycidoxypropyl)methyldiisopropenoxysilane,
γ-(glycidoxypropyl)methyldiethoxysilane,
γ-(glycidoxypropyl)dimethylethoxysilane,
γ-(glycidoxypropyl)diisopropylethoxysilane, and
γ-(glycidoxypropyl)bis(trimethylsiloxy)methylsilane.

The preferred epoxyalkoxysilane is γ-(glycidoxypropyl)trimethoxysilane.

The unsaturated alkoxysilane can be a vinylsilane, an allylsilane, an acrylic silane or a methacrylic silane.

Examples of vinylsilanes are vinyltris(2-methoxyethoxy)silane, vinyltrisisobutoxysilane, vinyltri-t-butoxysilane, vinyltriphenoxysilane, vinyltrimethoxysilane, vinyltriisopropoxysilane, vinyltriethoxysilane, vinyltriacetoxysilane, vinylmethyldiethoxysilane, vinylmethyidiacetoxy-silane, vinylbis(trimethylsiloxy)silane and vinyldimethoxyethoxysilane.

Examples of allylsilanes are allyltrimethoxysilane, alkyltriethoxysilane and allyltris (trimethylsiloxy)silane.

Examples of acrylic silanes are:
3-acryloxypropyltris(trimethylsiloxy)silane,
3-acryloxypropyltrimethoxysilane,
3-acryloxypropylmethyldimethoxysilane,
3-acryloxypropylmethylbis(trimethylsiloxy)silane,
3-acryloxypropyldimethylmethoxysilane, n-(3-acryloxy-2-hydroxypropyl)-3-aminopropyltriethoxysilane.

Examples of methacrylic silanes are:
3-methacryloxypropyltris(vinyldimethoxylsiloxy)silane,
3-methacryloxypropyltris(trimethylsiloxy)silane,
3-methacryloxypropyltris(methoxyethoxy)silane,
3-methacrylo-xypropyltrimethoxysilane,
3-methacryloxypropylpentamethyl disiloxane,
3-methacryloxypropylmethyldimethoxysilane,
3-methacryloxypropylmethyl-diethoxysilane,
3-methacryloxypropyldimethylmethoxysilane,
3-methacryloxypropyldimethylethoxysilane,
3-methacryloxypropenyltrime-thoxysilane, and
3-methacryloxypropylbis (trimethylsiloxy)methylsilane.

The preferred silane is acryloxypropyltrimethoxysilane.

Preferably, the amounts of epoxyalkoxysilane(s) and unsaturated alkoxysilane(s) used for the coupling agent preparation are such that the weight ratio $$R = \frac{\text{weight of epoxyalkoxysilane}}{\text{weight of unsaturated alkoxysilane}}$$

verifies the condition $0.8 \leq R \leq 1.2$.

The coupling agent preferably comprises at least 50% by weight of solid material from the epoxyalkoxysilane(s) and unsaturated alkoxysilane(s) and more preferably at least 60% by weight.

The coupling agent preferably comprises less than 40% by weight of liquid water and/or organic solvent, more preferably less than 35% by weight.

The expression "weight of solid material from epoxyalkoxy silanes and unsaturated alkoxysilanes" means the theoretical dry extract from those silanes which is the calculated weight of unit $Q_k Si O_{(4-k)/2}$ where Q is the organic group that bears the epoxy or unsaturated group and $Q_k Si O_{(4-K)/2}$ comes from $Q_k Si R'O_{(4-K)}$ where Si R' reacts to form Si OH on hydrolysis.

k is an integer from 1 to 3 and is preferably equal to 1.

R' is preferably an alkoxy group such as $OCH_3$.

The water and organic solvents referred to above come from those which have been initially added in the coupling agent composition and the water and alcohol resulting from the hydrolysis and condensation of the alkoxysilanes present in the coupling agent composition.

Preferred preparation methods for the coupling agent comprises:
1) mixing the alkoxysilanes
2) hydrolysing the alkoxysilanes, preferably by addition of an acid, such a hydrochloric acid
3) stirring the mixture
4) optionally adding an organic solvent
5) adding one or several catalyst(s) such as aluminum acetylocetonate
6) Stirring (typical duration: overnight).

Typically the amount of coupling agent introduced in the scratch-resistant coating composition represents 0.1 to 15% by weight of the total composition weight, preferably 1 to 10% by weight.

The abrasion and/or scratch-resistant coating composition can be applied on the anti-reflecting coating using any classical method such as spin, dip or flow coating.

The abrasion and/or scratch-resistant coating composition can be simply dried or optionally precured before application of the subsequent impact-resistant primer coating (which may be the dry latex layer) or implementation of the process of the invention. Depending upon the nature of the abrasion and/or scratch-resistant coating composition thermal curing, UV-curing or a combination of both can be used.

Thickness of the abrasion and/or scratch-resistant coating, after curing, usually ranges from 1 to 15 μm, preferably from 2 to 6 μm.

Before applying the impact resistant primer on the scratch-resistant coating, it is possible to subject the surface of the scratch-resistant coating to a corona treatment or a vacuum plasma treatment, in order to increase adhesion.

The impact-resistant primer coating can be any coating typically used for improving impact resistance of a finished optical article. Also, this coating generally enhances adhesion of the scratch-resistant coating on the substrate of the finished optical article.

By definition, an impact-resistant primer coating is a coating which improves the impact resistance of the finished optical article as compared with the same optical article but without the impact-resistant primer coating.

Typical impact-resistance primer coatings are (meth) acrylic based coatings and polyurethane based coatings.

(Meth)acrylic based impact-resistant coatings are, among others, disclosed in U.S. Pat. Nos. 5,015,523, 6,503,631 whereas thermoplastic and cross linked based polyurethane resin coatings are disclosed inter alia, in Japanese Patents 63-141001 and 63-87223, EP-0404111 and U.S. Pat. No. 5,316,791.

In particular, the impact-resistant primer coating according to the invention can be made from a latex composition such as a poly(meth)acrylic latex, a polyurethane latex or a polyester latex.

Among the preferred (meth)acrylic based impact-resistant primer coating compositions there can be cited polyethyleneglycol(meth)acrylate based compositions such as, for example, tetraethyleneglycoldiacrylate, polyethyleneglycol (200) diacrylate, polyethyleneglycol (400) diacrylate, polyethyleneglycol (600) di(meth)acrylate, as well as urethane (meth)acrylates and mixtures thereof.

Preferably the impact-resistant primer coating has a glass transition temperature (Tg) of less than 30° C.

Among the preferred impact-resistant primer coating compositions, there may be cited the acrylic latex commercialized under the name Acrylic latex A-639 commercialized by Zeneca and polyurethane latex commercialized under the names W213, W-240 and W-234 by Baxenden.

In a preferred embodiment, the impact-resistant primer coating may also includes an effective amount of a coupling agent in order to promote adhesion of the primer coating to the optical substrate and/or to the scratch-resistant coating.

The same coupling agents, in the same amounts, as for the scratch-resistant coating compositions can be used with the impact-resistant coating compositions.

The impact-resistant primer coating composition can be applied on the scratch-resistant coating using any classical method such as spin, dip, or flow coating.

The impact-resistant primer coating composition can be simply dried or optionally precured before molding of the optical substrate.

Depending upon the nature of the impact-resistant primer coating composition, thermal curing, UV-curing or a combination of both can be used.

Thickness of the impact-resistant primer coating, after curing, typically ranges from 0.05 to 30 µm, preferably 0.5 to 20 µm and more particularly from 0.6 to 15 µm, and even better 0.6 to 2 µm.

When the flexible carrier of the coated film is intended to be withdrawn at the completion of the process the face of film bearing the coating or coating stack may be first coated with a protecting and releasing coating which acts to protect the film face and has to be removed before implementing the process of the invention.

The applied films may also be uncoated films such as polarized films, coloured films, photochromic films, electricphotochromic films and printed films, preferably polarized films, coloured films and photochromic films, or combinations of these films, microstructured or logo film. The thickness of the films could be from 0.3 to 1.5 mm.

The force applied to the coated or uncoated film in step (e) of the inventive process may be obtained by applying pressure in particular air pressure or vacuum to the film. Typically the applied pressure will range from 0.35 to 3.5 $kg/cm^2$ (5 to 50 psi), preferably 0.3 to 3 $kg/cm^2$ and better 0.35 to 1.40 $kg/cm^2$ (5 to 20 psi).

When vacuum is used for creating the application force, the typically applied force may be around 130 Newtons.

Pressure may be applied using an inflatable membrane apparatus as disclosed in international patent application WO 03/004255.

Figure 1A:
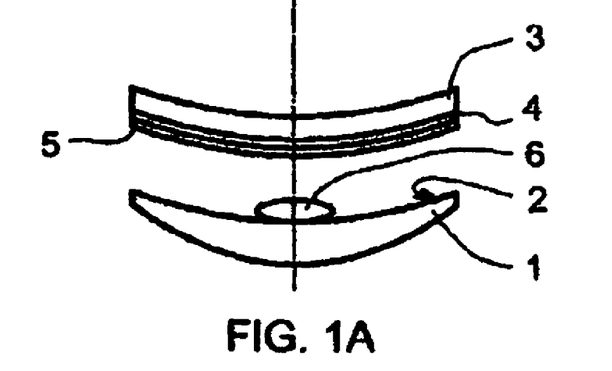
FIGS. 1A to 1C are schematic views of the main steps of a first embodiment of the process of the invention for applying a coated film onto a main surface of a lens substrate, in which the dry latex layer is formed on the coating.
Figure 1B:
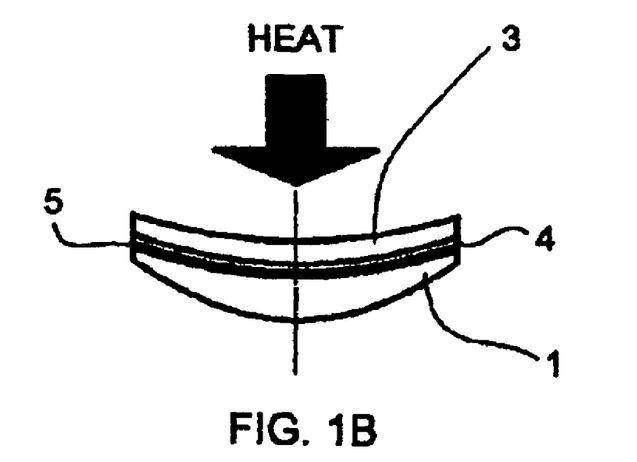
Figure 1C:
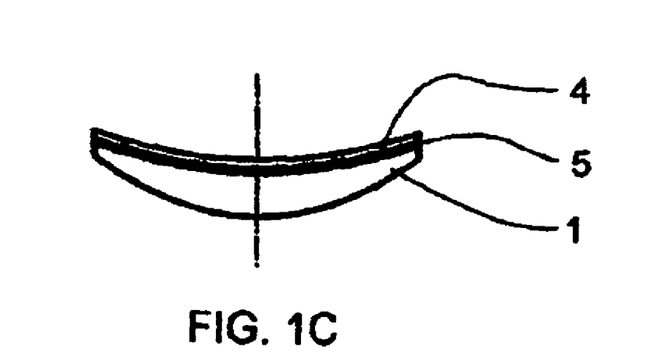

Referring now to the drawings and in particular to FIGS. 1A to 1C, a lens substrate 1 having a concave surface 2 is placed on a supporting element (not represented) with its concave (rear) surface 2 facing upwardly. A pre-measured drop of a water base activating liquid 6, for example deionized water, according to the invention is then deposited onto the surface 2 of the lens substrate 1. A coated film comprising a removable flexible carrier 3 which has been previously coated on one surface with a prescribed coating or coating stack 4 and a dry latex layer 5, is placed onto a supporting element (not represented) with the dry latex layer facing downwardly.

Deposition of coating or coating stack 4 and dry latex layer 5 on the surface of the flexible carrier 3 can be done through any usual deposition process employed in the optical field, such as vacuum deposition, spin coating, flow coating, dip coating etc. Of course, the deposition process will depend on the nature of the coating layer or layers and of the latex layer deposited on the surface of the flexible carrier 3.

Thereafter the supporting elements are moved relatively to each other to bring into contact dry latex layer 5 and water base activating liquid drop 6 and a pressure is exerted to the coated film in such a manner that the aqueous solvent drop will spread between the surface 2 of the lens substrate 1 and the dry latex layer 5. However, the exerted pressure shall only be sufficient for spreading the drop of aqueous solvent but insufficient to impart any deformation to the lens substrate 1.

The heating source in the present invention could be an air oven with temperature from 70 to 120° C., or a hot water bath from 70° C. to 100° C., IR heat source or microwave source. Heating time could be from few minutes to 30 minutes.

As shown in FIG. 1B, the assembly formed by the lens substrate 1, the aqueous solvent pellicule, the dry latex layer 5, the coating or coating stack 4, and the flexible carrier 3 is then placed into a device for heating. After heating, the pressure is released, the flexible carrier 3 is withdrawn and the lens substrate 1 having a coating or coating stack 4 adhered onto its concave surface 2 is recovered as shown in FIG. 1C.

Figure 2A:
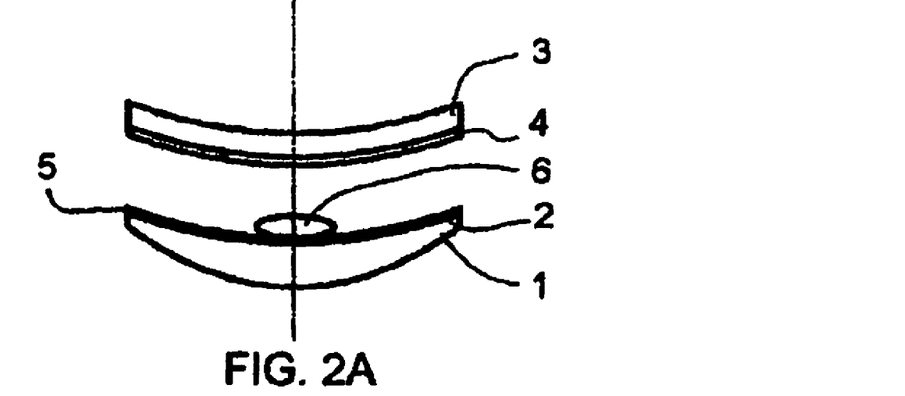
FIGS. 2A to 2C are schematic views of the main steps of a second embodiment of the process of the invention wherein the dry latex film is formed on a main surface of the lens substrate.
Figure 2B:
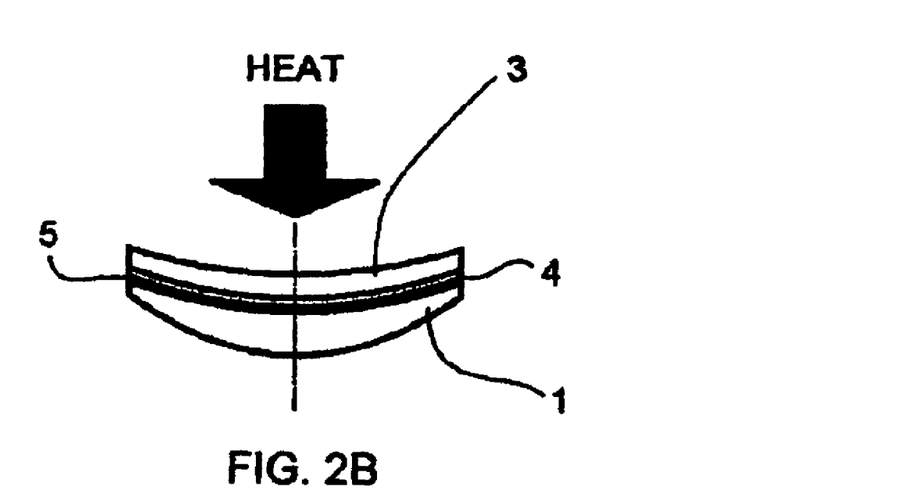
Figure 2C:
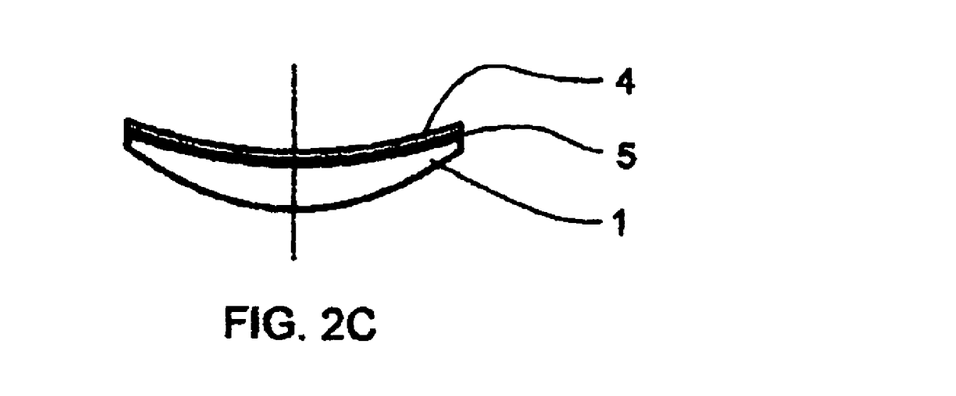

FIGS. 2A to 2C, represent the main steps of a similar process as disclosed in connection with FIGS. 1A to 1C except that the dry latex layer 5 is formed on the concave (rear) surface 2 of the lens substrate 1 and the drop of aqueous solvent 6 is deposited on the dry latex layer 5.

Figure 3A:
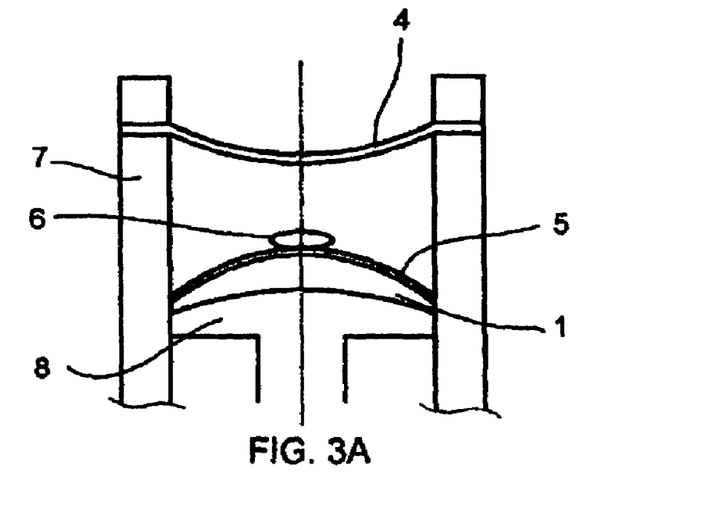
FIGS. 3A to 3C are schematic views of the main steps of a third embodiment of the process of the invention.
Figure 3B:
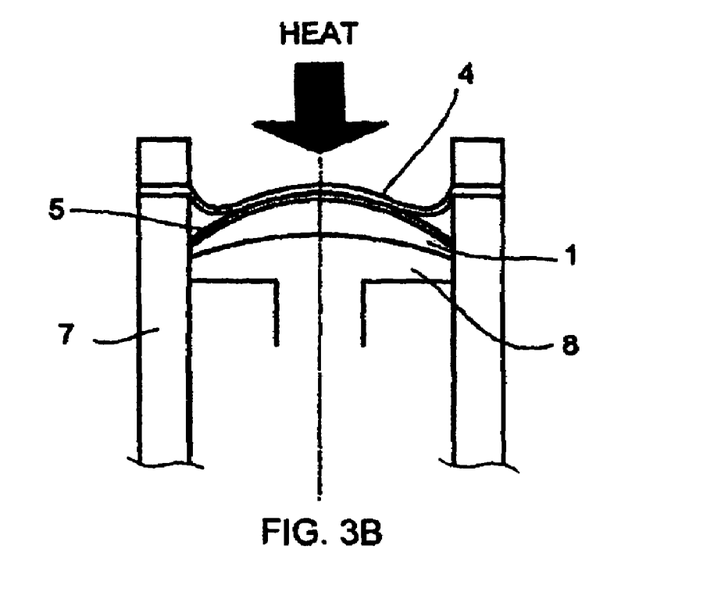
Figure 3C:
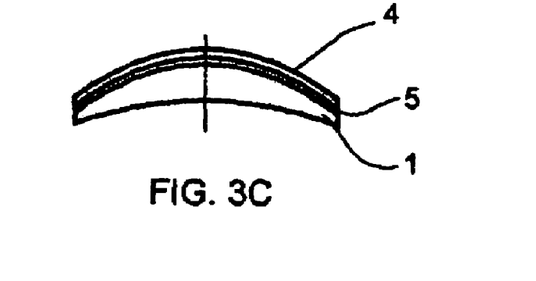

FIGS. 3A to 3C are schematic representations of the main steps of the process of the invention using an uncoated film and vacuum for application of the film on the lens substrate.

As shown in FIG. 3A, a lens substrate 1 is placed on a holder 8, movable within a vessel 7, with its concave surface directed upwardly.

The concave surface of the lens substrate 1 is coated with a dry latex layer 5 and a drop of aqueous solvent 6 is deposited on the dry latex layer 5.

A flexible uncoated film 4 is fixed in the vessel 7 above the lens substrate 1.

The vessel is placed under vacuum.

Then, as shown in FIG. 3B, the movable holder is raised due to the vacuum effect until the film 4 contacts the aqueous solvent drop 6.

The film 4 is deformed to conform to the concave surface of the lens substrate 1 and spreads the aqueous solvent on the dry latex layer 5.

The assembly is then heated.

After release of the vacuum and withdrawal from the vessel 7, there is recovered a lens substrate 1 having the film 4 laminated thereon as shown in FIG. 3C.

The following examples illustrate the present invention.

In examples 1 to 5, the coated film comprises a polycarbonate (PC) carrier bearing on its convex surface a coating stack including, starting from the carrier a hydrophobic top coat, an anti-reflective coating and an abrasion and/or scratch-resistant coating.

A dry latex layer is formed on the abrasion and/or scratch-resistant coating.

The assembly of the coating stack and the dry latex coating is called the HMC coating.

Step 1: Protecting and Releasing Coating

The composition of the protecting and releasing coating was as follows:

| Component | Parts by weight |
|---|---|
| PETA LQ (acrylic ester of pentaerythritol) | 5.00 |
| Dowanol PnP | 5.00 |
| Dowanol PM | 5.00 |
| n-propanol | 5.00 |
| 1360 (Silicone Hexa-acrylate, Radcure) | 0.10 |
| Coat-O-Sil 3503 (reactive flow additive) | 0.06 |
| Photoinitiator | 0.20 |

The PC carrier is cleaned using soapy water and dried with compressed air. The carrier convex surface is then coated with the above protecting coating composition via spin coating with application speed of 600 rpm for 3 seconds and dry speed of 1200 rpm for 6 seconds. The coating is cured using Fusion System H+ bulb at a rate of 1.524 m/minute (5 feet per minute).

Step 2: Hydrophobic Top Coat and Anti-Reflective (AR) Coating

The PC carrier after deposition of the protecting coating is vacuum coated as follows:

A/ Standard Vacuum AR Treatment: The Vacuum AR treatment is accomplished in a standard box coater using well known vacuum evaporation practices. The following is one procedure for obtaining the VAR on the mold:

1. The carrier having the protective coating already applied on the surface is loaded into a standard box coater and the chamber is pumped to a high vacuum level.

2. Hydrophobic coating (Chemical=Shin Etsu KP801M) is deposited onto the surface of the carrier using a thermal evaporation technique, to a thickness in the range of 2-15 nm.

3. The dielectric multilayer AR coating, consisting of a stack of sublayers of high and low refractive index materials is then deposited, in reverse of the normal order. Details of this deposition are as such:

The optical thicknesses of the alternating low and high refractive index layers are presented in the table (They are deposited in the indicated order, from the mold surface):

| Low index | 103-162 nm |
|---|---|
| High index | 124-190 nm |
| Low index | 19-37 nm |
| High index | 37-74 nm |

A preferred stack is a stack wherein the low index material is $SiO_2$ and the high index material is $ZrO_2$.

B/ At the completion of the deposition of the four-layer anti-reflection stack, a thin layer of $SiO_2$, comprising of a physical thickness of 1-50 nm, is deposited. This layer is to promote adhesion between the oxide anti-reflection stack and a lacquer hard-coating which will be deposited on the coated mold at a later time.

Step 3: Hard Coat (HC) & Latex Primer Coating

The composition of the hard coating is as follows:

| Component | Parts by weight |
|---|---|
| Glymo | 21.42 |
| 0.1 N HCl | 4.89 |
| Colloidal silica | 30.50 |
| Methanol | 29.90 |
| Diacetone alcohol | 3.24 |
| Aluminum acetylacetonate | 0.45 |
| Coupling agent | 9.00 |
| Surfactant FC-430 (3M company) | 0.60 |

The composition of the primer is as follows:

| Component | Parts by weight |
|---|---|
| Polyurethane latex W-234 | 35.0 |
| Deionized water | 50.0 |
| 2-Butoxy ethanol | 15.0 |
| Coupling agent | 5.00 |

The PC carrier after deposition of protecting coating and AR coating in Steps 1 and 2 is then spin coated by HC solution at 600 rpm/1200 rpm, and precured 10 minutes at 80° C., and again spin coated by latex primer solution at the same speed and postcured for 1 hour at 80° C.

The coupling agent is a precondensed solution of:

| Component | Parts by weight |
|---|---|
| GLYMO (Glycidoxypropyltrimethoxysilane) | 10 |
| Acryloxypropyltrimethoxysilane | 10 |
| 0.1 N HCl | 0.5 |
| Aluminum acetylacetonate | 0.5 |
| Diacetone alcohol | 1.0 |

Testing and Inspection Procedures:

Dry adhesion is measured using the cross-hatch adhesion test according to ISTM 02010, using 3M SCOTCH® no 600 transparent tape.

25 squares are formed.

Adhesion is rated as follows:

| Adhesion score | Squares removed | Area % left intact |
|---|---|---|
| 0 | 0 | 100 |
| 1 | <1 | 96 |
| 2 | 1 to 4 | 96-84 |
| 3 | >4 to 9 | 83-64 |
| 4 | >9 to 16 | 63-36 |
| 5 | >16 | <36 |

Wet adhesion test: same test method as dry adhesion test except the sample is boiling in hot water at 100° C. for 30 minutes before implementing the test.

Carrier Preparation:

0.5 mm PC carrier made by injection with 5.8 and 6.4 base is coated on their convex surface with HMC coating as disclosed above.

Lens Preparation:

Lenses are corona discharge treated using 3DT equipment. The lenses go in front of the discharge head at a speed of 17 mm/s. There is 4 passes with a 5s delay between each pass. Then, the lens is lowered down in order to treat its upper part and goes through another set of 4 passes with 5s delays in between at a speed of 17 mm/s.

Corona power is applied under 15 000 to 20 000 volts.

EXAMPLE 1

−2.00 surfaced polycarbonate lenses with back curve of 5.0 bases is washed with soap and rinsed with deionized (DI) water. Then, few drops of DI water are placed on the back surface of the lens and 5.8 base carrier with a reversed HMC coating is applied on the water, after that, an air pressure of 12 PSI (0.827 bar) is applied on the carrier to deform the carrier matching 5.0 back curve of the lens so that a thin water pellicule between lens and the HMC carrier is formed. Maintaining 12 PSI (0.827 bar) pressure, the assembly is heated in an oven at 110° C. for 30 minutes. Then, cooled down and the air pressure is released. After withdrawal of the carrier, the HMC coating is transferred very well on the PC lens surface. The obtained lens has very good optics and cosmetics and good AR performance. The whole process is very simple and clean without any chemical adhesive involved. The dry adhesion test of this lens is scored 0 according to dry adhesion cross hatch test. The wet adhesion test (after boiling in hot water at 100° C. for 30 minutes) also shows very good adhesion with scored 0.

EXAMPLE 2

Same procedure as Example 1 for the coating transfer, except a CR-39® lens whose back curve is surfaced to 6.0 base and a 6.4 base HMC carrier are used. After heating at 110° C. for 30 minutes under 12 PSI (0.827 bar), the carrier is removed and the HMC coating transferred to the lens surface. There is no AR cracking during this transfer.

EXAMPLE 3

Same as Example 1, except a 6 base plano lens is used with 6.4 base HMC carrier. After heating at 110° C. for 30 minutes under 12 PSI (0,827 bar), the carrier is removed and the HMC coating transferred to the lens surface. There is no AR cracking during this transfer.

EXAMPLE 4

Same as Example 2, except the CR-39® lens is treated by Corona discharge before the transfer. The obtained lens has very good optics and cosmetics and good AR performance. The dry adhesion test of this lens is scored 0 according to dry adhesion cross hatch test.

EXAMPLE 5

Same as Example 4, except 1.67 refractive index polyurethane lens MR7 is used. The obtained lens has very good optics and cosmetics and good AR performance. The dry adhesion test of this lens is scored 0 according to dry adhesion cross hatch test.

EXAMPLE 6

A CR-39® lens with back curve of 4.5 base is coated with a latex layer as used in the HMC coating carrier preparation. A polarized film of polyvinyl-alcohol from Tanaka Co with 5.0 base is laminated with water as a medium as in Ex. 1. Then, it is heated in oven at 70° C. for 30 min.

After the pressure was released, a polarized CR-39® lens is obtained.

EXAMPLE 7

Same procedure as Example 1 for the coating transfer, except the HMC carrier was previously pre-tinted by dipping it in a BPI dye water solution at 91° C. for 5 minutes to get a tinted latex coating of the HMC carrier. Then the tinted latex coating of the HMC carrier was washed with deionized water and the carrier was laminated to the lens following the procedure of example 1. After being laminated to the lens and heated at 110° C. for 20 minutes in an air oven under 12 PSI (0.827 bar), the carrier was removed and a colored HMC coating was transferred to the lens surface. The obtained lens has a very uniform color with 10% of transmission measured by the BYK Gardner and there is no AR cracking during this pre-tinting and transferring. The dry adhesion test showed score 0.

EXAMPLE 8

Same procedure as Example 1 for the coating transfer, except 6.8 base (sphere) HMC carrier was used to match a 5.8 base back curve with 1.00 add progressive of a polycarbonate lens. After heating at 110° C. for 20 minutes in an air oven under 12 PSI (0.827 bar), the carrier was removed and a HMC coating layer was transferred to the progressive surface without any AR cracking and optical distortion. The thickness of the latex layer after transferred in the entire lens progressive area was as even as spin coated before in the flexible carrier, and around 1.5 µm.

EXAMPLE 9

Same procedure as Example 1 for the coating transfer, except the polyurethane latex was replaced by an acrylic latex of the core/shell type with the core being butylmethacrylate with a dimethacrylate crosslinking agent and shell being butylmethacrylate.

The latex is prepared according to the process described in U.S. Pat. No. 6,770,710, except that there is no added photochromic agent.

After heating at 110° C. for 20 minutes in air oven under 12 PSI (0.827 bar), the carrier was removed and a HMC coating layer was very well transferred to the lens surface without any AR cracking.

EXAMPLE 10

Same procedure as Example 4 for the coating transfer, except the lens (+3.00) was fined with a 9 micro pad for 2 minutes by LOH Toro-X-2SL fining machine without being polished and 4.8 base HMC carrier was used. After heating at 110° C. for 20 minutes in an air oven under 12 PSI (0.827 bar), the carrier was removed and a HMC coating layer was transferred to the fined lens successfully. The obtained lens was as clear as the polished lens of Example 4.

EXAMPLE 11

5.8 base PC carriers (73 mm diameter) were obtained with, deposited in this order from the surface of the carrier, the protective and release coating, the hydrophobic top coat, the AR coating all of which have been previously described, and around 3 microns of a hard coating corresponding to example 3 of EP-614957: (Hard coating preparation: 80.5 parts of 0.1N hydrochloric acid were added dropwise to a solution containing 224 parts of GLYMO (γ-glycidoxypropyltrimethoxysilane) and 120 parts of DMDES (dimethyldiethoxysilane). The hydrolyzed solution was stirred for 24 hours at room temperature and then 718 parts of 30% colloidal silica in methanol, 15 parts of aluminium acetylacetonate and 44 parts of ethylcellosolve were added. A small amount of surfactant was added. The TDC (theoretical dry extract) of the composition was in the order of 13% of solid material from the hydrolysed DMDES).

The obtained carriers then spin coated with the latex compositions of Table 1. Latex compositions layers are then dried at 85° C. for 15 minutes to form dry latex layers of 2 μm thickness.

The carriers were corona treated as previously described before spin coating the latex compositions.

Solid material content of latex compositions, speed and duration of spin coating and glass transition temperatures (Tg) of the dry latex layers are given in Table 1.

TABLE 1

| Test n° | Latex composition | Dry extract wt % | Spin coating speed (2 μm thick) and duration | Tg of dried layer (° C.) |
|---|---|---|---|---|
| 1 | Witcobond W-213 ® | 28-30 | 300 rpm/10 s | −30 |
| 2 | Witcobond W-240 ® | 29-31 | 400 rpm/10 s | −53 |
| 3 | Witcobond W-234 ® with coupling agent | 30 | 750 rpm/20 s | — |
| 4 | Witcobond W-234 ® without coupling agent | 30 | 750 rpm/20 s | −25 |

5.8 base PC lenses (71 mm diameter) are washed before transfer process. The carriers are air blown before transfer.

Transfer is performed as in example 1 except that all samples are placed in an oven for 1 hour at 120° C.

Results of transfer are given in Table 2

TABLE 2

| TEST N° | TRANSFER | COSMETICS AFTER TRANSFER | ADHESION AFTER TRANSFER |
|---|---|---|---|
| 1 | YES | CLEAR | 5, 0, 0 |
| 2 | YES | CLEAR | 0, 2, 0, 0, 0, 0 |
| 3 | YES | CLEAR | 0, 0, 0 |
| 4 | YES | CLEAR | 0, 0, 0 |

Determination of the "tacky" temperature of the dry latex layer.

Basically, the test for measuring the "tacky" temperature consists in repeatedly moving down a probe so that a flat end of the probe touches the latex layer under a specified pressure (positive force) and lifting off the probe from the latex layer under a specified force (negative force) while the layer is subjected to a programmed temperature increase. The "tacky" temperature is the temperature at which the probe sticks to the layer and is no longer able to be lifted off from the sample.

Figure 4:
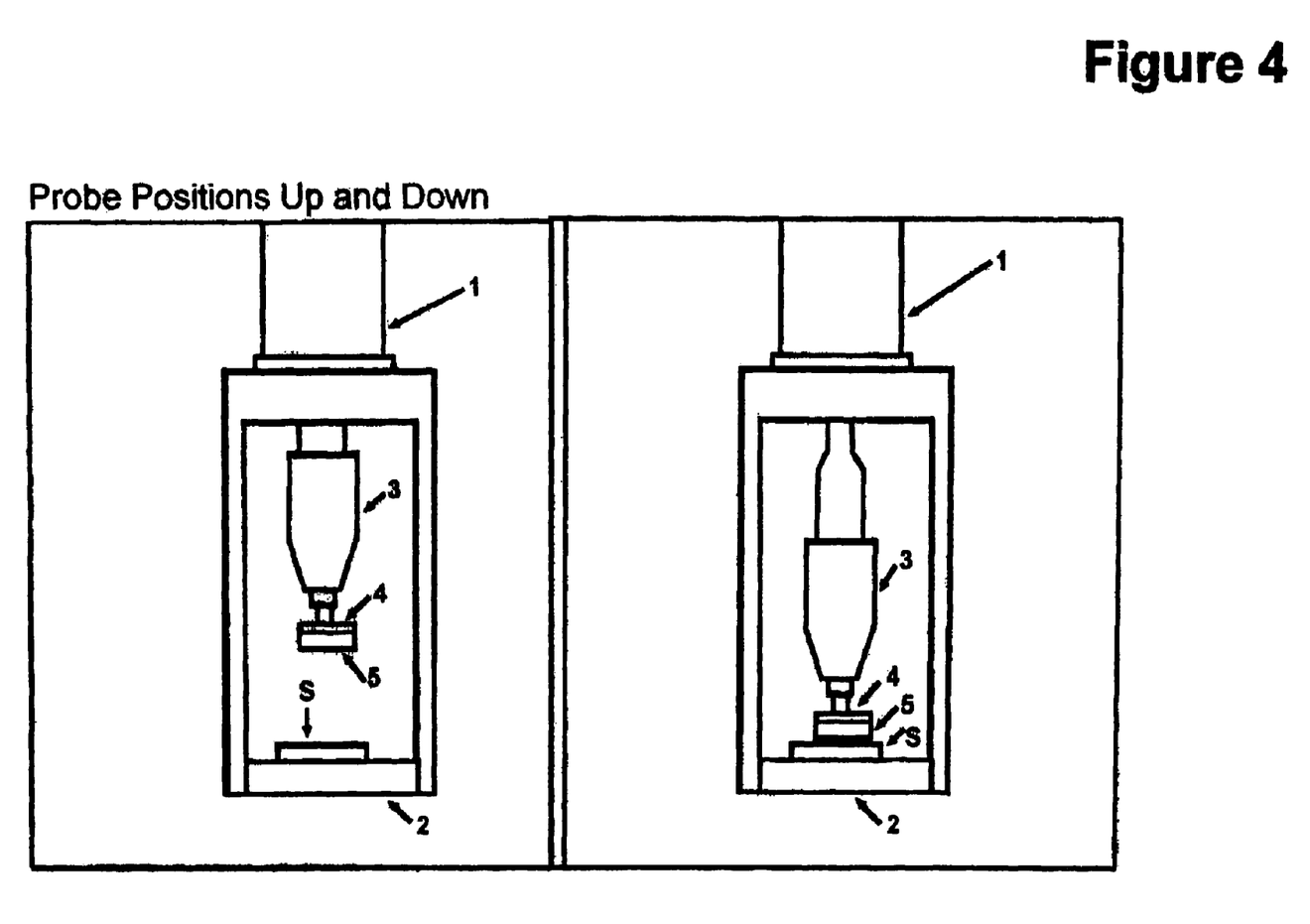
FIG. 4, schematic views of the apparatus for measuring the "tacky" temperature with the probe in up and down positions.

The "tacky" temperature is measured using a Perking Elmer Dynamic Mechanical Analyser, schematically represented in FIG. 4, working in creep-recovery mode. A creep-recovery test is a test in which a constant load is applied for a specified duration of time on the sample and dimensional distortion is monitored. Then the load is released (but still having enough force to stay in contact with the sample) and the recovering ability of the material is monitored. However, in the measurement of the "tacky" temperature the Perkin Elmer DMA is used in a somewhat unconventional way in the "creep-recovery mode."

More specifically, the latex composition is spin coated on a flat polycarbonate sheet and dried at 85° C. for 15 minutes. Small rectangular samples (1.5 cm×0.5 cm) are cut from the PC sheet. For each kind of dry latex layers two samples are tested. If repeatable temperature is not obtained with two samples, more samples are tested until repeatable data is obtained. Typically the dried latex layer, for this test, has a thickness of 4 to 7 μm.

Referring to FIG. 4, the sample S is secured on the supporting plate 2 of the analyzer 1, with the latex layer facing the probe 3, using a double sided adhesive tape.

A generic differential scanning calorimetry pan 5 (typically 6.7 mm conventional aluminum DSC pan) is placed over the flat tip 4 of the probe.

Figure 5:
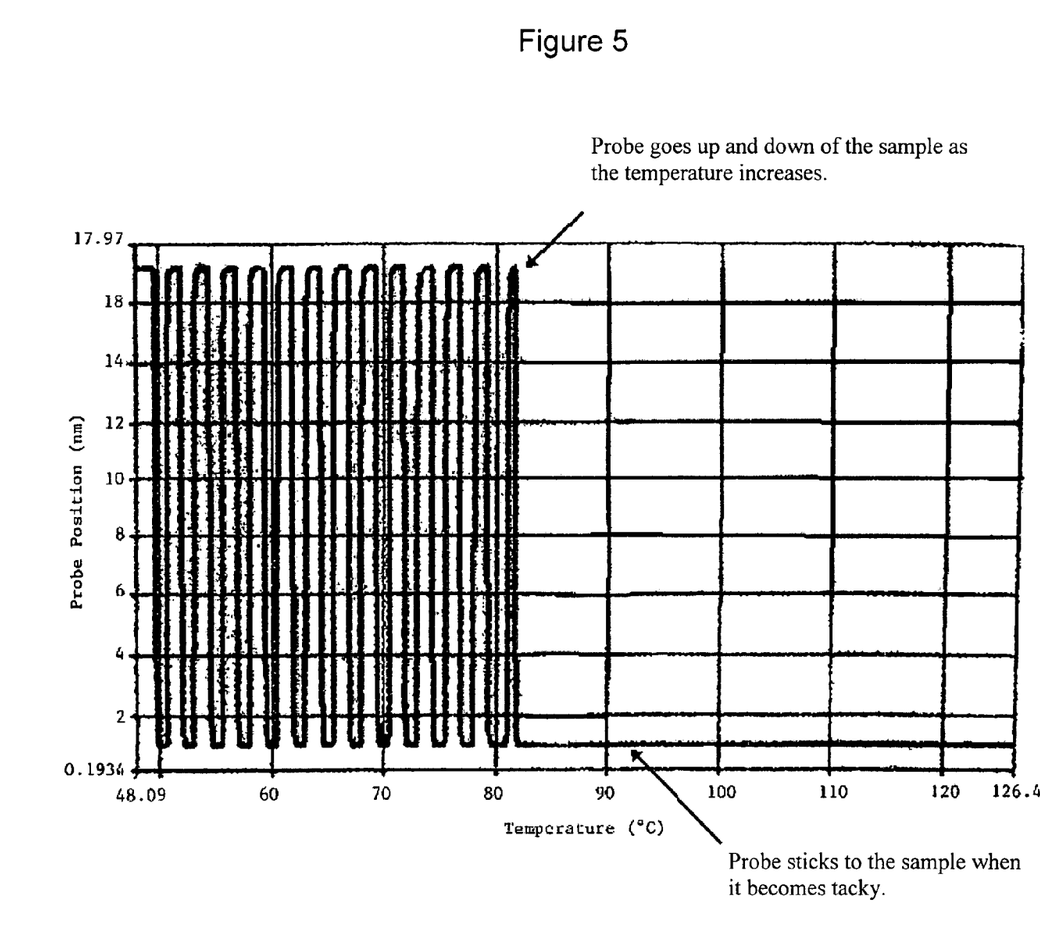
FIG. 5, a graph of registration for measuring the "tacky" temperature.

The probe is moved down into contact with the latex layer and lifted off the layer under specified conditions while the temperature of the DSC pan is increased according to a program until the probe sticks to the layer. Movement of the probe during temperature increase is registered as shown in FIG. 5. The "tacky" temperature is the temperature at which the probe sticks to the layer.

The following parameters have been used for measuring the "tacky" temperature.

Perkin Elmer DMA 7e Analyzer-Creep Recovery mode
Creep: 30 mN (positive force. Probe down), 0.5 minute;
Recovery: −25 mN (Negative force. Probe up), 0.5 minute;
Parallel Plates diameters.
Top probe plate 5 mm/ with DSC pan 6.7 mm
Bottom plate (support) 20 mm
Heat program: 50-100° C. at 2.5° C./minute
Nitrogen Purge/Intracooler 1

"Tacky" temperatures for some dry latex layers are given in Table 3 below.

| Latex layer | Thickness of latex layer (μm) | "Tacky" temperature (° C.) |
|---|---|---|
| Witcobond W 213 | 3.9-4.0 | 90-93 |
| Witcobond W 234 with coupling agent | 4.9-5.2 | 61 |
| Witcobond W 240 | 4.45 | 112-117 |
| Witcobond W 234 without coupling agent | 6.2-7.3 | 49-54 |

The invention claimed is:

1. A process for applying a coated or uncoated film onto at least one surface of a lens substrate comprising:

(a) providing a lens substrate having main surfaces;
(b) providing a coated or uncoated film;

(c) forming, on either a surface of the coated or uncoated film or one of the said surfaces of the lens substrate, a layer of a dry latex;

(d) depositing at least one drop of a water-based activating liquid on either the said main surface of the lens substrate, a surface of the coated or uncoated film or an exposed surface of the dry latex layer;

(e) moving relatively to each other the coated or uncoated film and the lens substrate and applying a sufficient force to the coated or uncoated film to spread the water-based activating liquid and form a thin pellicule of the water-based activating liquid between the dry latex layer and either the lens substrate or the coated or uncoated film;

(f) heating the thin pellicule of water-based activating liquid and the dry latex layer;

(g) releasing the applied force; and (h) recovering the lens substrate with the coated or uncoated film adhered to the lens substrate main surface.

2. The process of claim 1, wherein the water-based activating liquid is further defined as water, a mixture of water and at least one organic solvent, a latex and a mixture of an aqueous solvent, or a latex.

3. The process of claim 2, wherein the water-based activating liquid is further defined as comprising at least one alkanol.

4. The process of claim 2, wherein the water-based activating liquid is further defined as comprising deionized water.

5. The process of claim 2, wherein the water-based activating liquid is further defined as comprising a mixture comprising water and latex with a dry extract of up to 20% by weight.

6. The process of claim 5, wherein the dry extract is up to 15% by weight.

7. The process of claim 1, wherein the dry latex layer comprises at least one poly(meth)acrylic latex, polyurethane latex, or polyester latex.

8. The process of claim 1, wherein the lens substrate comprises a thermoplastic or thermosetting organic material.

9. The process of claim 8, wherein the lens substrate comprises a polycarbonate, a thermoplastic or thermosetting polyurethane, a polythiourethane, a polyepoxide, a polyepisulfide, a poly(meth)acrylate, a polythio(meth)acrylate, or a diethyleneglycol bis allylcarbonate copolymer.

10. The process of claim 1, wherein the lens substrate main surface is chemically or physically pretreated.

11. The process of claim 10, wherein the lens substrate main surface is pretreated by a corona discharge treatment.

12. The process of claim 1, wherein the force applied on the coated or uncoated film in step (e) is obtained by application of a pressure or of a vacuum on the coated or uncoated film.

13. The process of claim 1, wherein heating step (f) comprises heating at a temperature of 60 to 120° C.

14. The process of claim 1, wherein the film is a coated film comprising a flexible carrier a surface of which bears at least one coating.

15. The process of claim 14, wherein the coating is a functional coating further defined as a hydrophobic top coat, an anti-reflective coating, an abrasion-resistant coating, a scratch-resistant coating, and/or an impact-resistant primer coating.

16. The process of claim 14, further comprising a step (i) of withdrawal of the flexible carrier, whereby at the completion of the process the coating or coatings are transferred from the flexible carrier to the lens substrate main surface.

17. The process of claim 16, wherein the coated film comprises in order starting from the flexible carrier surface, a hydrophobic top coat, an anti-reflective coating, and an abrasion and/or scratch-resistant coating.

18. The process of claim 17, wherein the coated film further comprises an impact-resistant primer coating on the abrasion and/or scratch-resistant coating.

19. The process of claim 14, wherein the coating is further defined as a photochromic coating, a dye comprising coating, a polarized coating, and/or a microstructured coating.

20. The process of claim 14, wherein the coated film comprises at least one of topcoat, antireflective coating, or abrasion resistant coating, and the dry latex forms an impact resistant coating on the coated lens substrate.

21. The process of claim 14, wherein the dry latex layer is formed either on a main surface of the lens substrate, on an uncoated surface of the coated film, or on the at least one coating.

22. The process of claim 21, wherein the dry latex layer is formed on the coating or coatings or on a lens substrate main surface.

23. The process of claim 14, wherein the flexible carrier comprises thermoplastic material.

24. The process of claim 23, wherein the thermoplastic material comprises polycarbonate.

25. The process of claim 14, wherein the flexible carrier has a thickness of 0.2 to 5 mm.

26. The process of claim 14, wherein the carrier has a spheric shape and the lens substrate has a rear(concave) spheric, toric or progressive surface.

27. The process of claim 14, wherein the carrier has a spheric shape and a convex surface bearing coating(s) to be transferred and the lens substrate has a rear(concave) spheric, toric or progressive surface on which the coatings are to be transferred.

28. The process of claim 1, wherein the lens substrate is either polished or fined.

29. The process of claim 1, wherein the film is an uncoated film further defined as a polarizing film, a colored film, a photochromic film, an optical-electronical film, an electric-photochromic coating, and/or a printed layer.

30. The process of claim 29, wherein the dry latex is formed on a lens substrate main surface.

31. The process of claim 29, wherein the force applied on the uncoated film is obtained by application of a vacuum.

* * * * *